3,787,459
SELECTIVE HYDROFORMYLATION OF UNSATURATED FATTY COMPOUNDS
Edwin N. Frankel, Peoria, Ill., assignor to the United States of America as represented by the Secretary of Agriculture
No Drawing. Filed Oct. 23, 1970, Ser. No. 83,618
Int. Cl. C07c *59/28, 69/66;* C11c *3/00*
U.S. Cl. 260—410.7                                   11 Claims

ABSTRACT OF THE DISCLOSURE

A process is described for converting unsaturated vegetable oil material without isomerization into high yields of formyl products which can be subsequently reduced to the corresponding hydroxymethyl products or oxidized to the corresponding carboxy products. The conversion is accomplished by reacting vegetable oil material with hydrogen and carbon monoxide in the presence of a highly selective catalyst system.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the preparation of fatty formyl compounds in very high yields by the reaction of fatty compounds with carbon monoxide and hydrogen in the presence of a highly selective catalyst system. It further relates to certain novel compounds formed by hydroformylation of polyunsaturated fatty compounds. The term "fatty compounds" will be understood to mean any triglyceride oil, free fatty acids, free fatty esters, or other derived fatty materials.

Hydroformylation is a well-known process for introducing oxygen functionality into olefinic compounds by their reaction with carbon monoxide and hydrogen in the presence of metal carbonyl catalysts, usually dicobalt octacarbonyl. The use of such catalysts requires elevated pressures and temperatures which result in side reactions including hydrogenation of the olefinic unsaturation and that results in lowering of the yield of aldehyde products and further reduction of the aldehyde compounds to hydroxy compounds. Another important side reaction that has been observed during hydroformylation is the isomerization of olefinic unsaturation to a large number of internal carbon positions of the olefinic compound. A very complex isomeric mixture of branched aldehyde as well as cis, trans unsaturated isomeric products results. The hydroformylation of long chain fatty acid compounds (e.g., those having 18 carbon atoms) by oxo catalysts such as cobalt carbonyl results in a large number of isomers with aldehyde branches located on carbon atoms number 5, 6, 7, 8, 9, 10, 11, 12, and 13 plus also a significant amount in the terminal carbon position 18 and consisting of linear carbon-19 aldehydes. Air oxidation of these hydroformylation aldehyde fatty products results in the formation of corresponding carboxy stearic derivatives with the same complex mixture of branched and linear isomers.

Another process for the introduction of carboxyl function into unsaturated fatty compounds is the reaction known as carboxylation using concentrated sulfuric acid, water, and carbon monoxide. The carboxylated derivatives prepared from long chain unsaturated fatty compounds by this reaction with sulfuric acid and carbon monoxide consist also of a large number of isomers with carboxyl branches located between carbon number 4 and carbon number 17.

The carboxylated derivatives of the long chain unsaturated fatty compounds prepared by both catalytic hydroformylation and by sulfuric acid carboxylation are liquid at room temperature and have low reactivity. The application of these carboxylated derivatives in various polymer applications such as in alkyd resins, polyesters, and polyamides result in products with an undesirably wide range of properties because of the great number of branched isomers present in the starting materials. There has existed a need for the preparation of oxygenated derivatives of long chain fatty compounds with only a small number of isomers to permit the preparation of polymers with more uniform, homogeneous, and predictable properties and hence, much more useful than the known polymers that can be made from the mixture of a large number of oxygenated isomers now available from prior art hydroformylation and carboxylation. The present invention satisfies this need.

A principal object of this invention is the provision of a direct process for converting predominantly monounsaturated fatty compounds into aldehyde products by the use of a highly selective hydroformylation catalyst system which prevents the isomerization of the double bond and consequently results in the preparation of isomers with aldehyde groups attached only to the original unsaturated carbon atoms of the fatty acid radical. A more specific object is to add aldehyde functionality to olive oils, oleic safflower oils, and oleic acid derivatives without isomerization of the natural 9–10 double bond and therefore to give a mixture of only two aldehydes consisting of the 9- and 10-formyl ester, acid, or triglyceride oil. Of course, if the unsaturation is primarily located at another position such as carbon 13 in erucic oils, the formyl group would be located at carbon positions 13 and 14 predominantly. The aldehyde product can be readily oxidized to the 9- and 10-carboxy stearic ester, acid or triglyceride oils or reduced by catalytic hydrogenation to the 9- and 10-hydroxymethyl stearic ester, acid, or triglyeride oils. This simple mixture of 9- and 10-carboxy acid products being solid and crystalline at room temperature is very useful in producing desirably higher melting solid polymers.

In accordance with the objects of the invention, I have discovered a process for introducing oxygen functionality into predominantly monounsaturated fatty compounds such as oleic acid, oleic alkyl esters, and oleic triglyceride oils (e.g., olive oil, oleic safflower oil, etc.). The fatty compounds are reacted with hydrogen and carbon monoxide at pressures from about 500 to 3,000 p.s.i.g. in the presence of a catalytic quantity of rhodium metal on a relatively inert support (e.g., carbon, calcium carbonate, or alumina) admixed with a trisubstituted phosphine. At temperature of from about 94° to 180° the reaction will produce extremely high yields of formyl products in a short period of time (from 4 to 6 hours), after which the reaction mixture is filtered to obtain the formyl products free from the solid catalyst material. The formyl products are uniquely characterized as having the formyl groups attached only at the carbon atoms which were originally unsaturated in the monounsaturated fatty compounds of the starting material. A catalyst for continuous hydroformylation of unsaturated fatty compounds is contained in the filtered crude formyl products from the instant process. A small portion (i.e., enough to contain a catalytic amount of rhodium material) is used to catalyze subsequent hydroformylations by heating under pressure with hydrogen and carbon monoxide.

The instant process is extended to the conversion of the formyl groups in the formyl products to hydroxymethyl groups by catalytic hydrogenation, and to carboxy groups by oxidation with air and potassium permanganate. Essentially the same process is used to convert predominantly polyunsaturated fatty compounds such as linoleic acids, and alkyl and triglyceryl esters; and linolenic acids, and alkyl and triglyceryl esters to high yields of mixed saturated and unsaturated mono- and polyformyl products. The polyunsaturated fatty compounds are reacted with hydrogen and carbon monoxide at pressures of from about 1,000 to 1,500 p.s.i.g. in the presence of a catalytic quantity of rhodium metal on a relatively inert support admixed with a trisubstituted phosphine at temperatures of from about 100° to 150° C. Linoleic fatty products form mono- and diformyl saturated and monoformyl monounsaturated compounds, while linolenic fatty products form mono-, di-, and triformyl saturated, monoformyl diunsaturated, and diformyl monounsaturated compounds. The most important of these compounds are:

Formyl oleate,

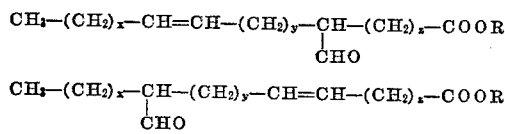

where $x+y+z=13$;
Formyl linoleate,

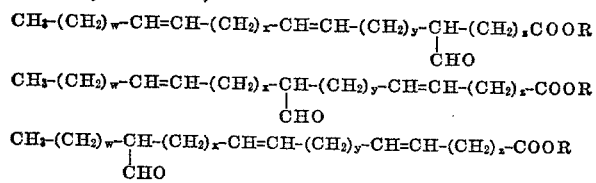

where $w+x+y+z=11$;
Diformyl stearate,

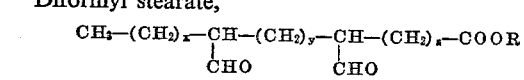

where $x+y+z=14$;
Diformyl oleate,

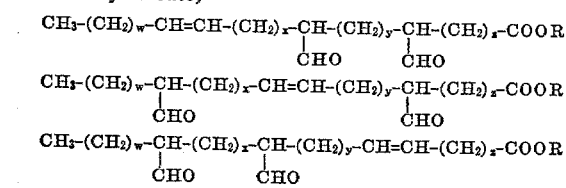

where $w+x+y+z=12$; and where R is a hydrogen, a methyl, or a triglyceride (i.e., diacyloxypropyl where each acyloxy moiety contains from 16 to 21 carbons) radical.

The formyl esters, triglycerides, or acids produced by the selective catalytic process of this invention may be used as modifying agents for synthetic resins. The hydroxymethyl esters, triglycerides, or acids obtained by the reduction of the corresponding formyl products are particularly useful in the preparation of polyurethane foams and polyesters. The carboxy methyl esters, triglycerides, or acids obtained by the oxidation of the corresponding formyl products are useful in the manufacture of alkyd resins, polyamides, polyesters, and other polymer applications, or when fully esterified, they can be used as plasticizers or as synthetic lubricants.

DETAILED DESCRIPTION OF THE INVENTION

The instant invention can be practiced with any fatty compound containing unsaturation that does not substantially reduce the catalytic effect of the rhodium-supported catalysts in the presence of a suitably trisubstituted phosphine or phosphite. A triphenylphosphine for example, when used at a wide range of concentrations, has the remarkable and quite unexpected property of increasing the activity of the hydroformylation rhodium catalysts and at the same time completely preventing the isomerization of the double bond in the unsaturated fatty material and also protecting the aldehyde product from thermal degradation and reduction to alcohols. Predominantly monounsaturated oils such as crambe, rapeseed, and celery seed oils where the double bonds are located primarily at positions other than carbon 9 may also be hydroformylated. Polyunstaturated vegetable oils such as soybean, linseed, and safflower oils and their derivatives can be used. Fatty glycerides, their acids, or other derivatives from animal fats and fish oils may also be hydroformylated. Isomerized derivatives such as elaidic acid can also be hydroformylated in high yields. Unsaturated oils and fats containing hydroxy groups such as castor oil and ricinoleic esters will absorb carbon monoxide and hydrogen to form oxygen containing fatty derivatives.

In the preferred process, 0.5 percent (by weight) rhodium metal deposited on an inert support (i.e., carbon, calcium carbonate, or alumina) is used in the presence of triphenylphosphine to catalyze the reaction. From about 0.02 to 0.4 percent rhodium metal and from about 0.25 to 7 percent triphenylphosphine by weight of fatty compound was sufficient to produce the desired products. A suitable pressure vessel such as an autoclave is charged with the unsaturated fatty compound and the catalyst (with or without a solvent). The vessel is then filled with hydrogen and carbon monoxide in ratios of from 1:1 to 2:1 at total pressures of from 500 to 3,000 p.s.i.g. The reaction mixture is then heated and reaction begins when the temperature reaches approximately 95° C. The temperature in this preferred process is maintained at from 95° to 180° for up to 6 hours. The solid catalyst in the reaction mixture is then removed by filtration from the crude formyl products. The crude product may subsequentlyl be purified by distillation.

It should be understood by anyone skilled in the art that parameters of time, temperature, pressure, and quantity of catalyst can be varied to a considerable extent. For example, a pressure of 3,000 p.s.i.g. is specified as being preferred only because of pressure limitations of the reaction vessel. If a higher pressure were used, the other parameters would have different limits. Therefore, the invention should not be limited to the parameters disclosed in the discussion above or in the examples.

Hydroformylation by the instant method of oleic acid or oleic vegetable oils such as olive or oleic safflower oil converts substantially all of the unsaturation of the fatty components into only formyl stearic oil, or acid, or methyl ester without causing at most a trivial further reduction of the formyl group into hydroxymethyl group or hydrogenation of the carbon-carbon olefinic double bond and most unexpectedly without inducing isomerization of the double bond to permit the exclusive formation of the 9- and 10-formyl stearic, or acid, or methyl ester.

I have discovered that the crude formyl product obtained from oleic esters after filtration of the insoluble components of the rhodium catalyst contains an active rhodium component which can catalyze further selective hydroformylation when the crude reaction product is admixed with fresh oleic esters and heated under pressure with carbon monoxide and hydrogen to convert essentially all of the additional unsaturation into formyl stearic ester product. The crude hydroformylation products can therefore be recycled with fresh esters in various proportions to catalyze further hydroformylation and provide an economic reuse of the rhodium hydroformylation and provide an economic reuse of the rhodium hydroformylation catalyst.

The insoluble and soluble constituents of the rhodium catalyst system used in the instant invention are different from the hydrido carbonyl complex derived from tris-triphenylphosphine rhodium chloride complex which is a known soluble or homogeneous hydroformylation catalyst. When tris-triphenylphosphine rhodium chloride complex is used for the hydroformylation of pure methyl oleate the reaction is very slow and in the presence of triphenylphosphine at 110° C. and 1,600 p.s.i.g. hydrogen and 800 p.s.i.g. carbon monoxide, it requires 24 hours to obtain about 87 percent conversion of oleate into formyl stearate. This soluble catalyst derived from tris-triphenylphosphine rhodium chloride complex is also not selective because when it is used in the hydroformylation of methyl oleate at a temperature of 180° C. instead of 110° C. under otherwise similar conditions the product obtained is a mixture of 6.8 percent formyl stearate and 75.4 percent hydroxymethyl stearate. In this respect the soluble catalyst derived from tris-triphenylphosphine rhodium chloride complex is similar to cobalt carbonyl catalysts which are also known to transform oleic esters into formyl esters at 100°–110° C. and into hydroxymethyl esters at 175°–190° C. In contrast to those soluble rhodium and cobalt carbonyl catalysts, I have discovered most unexpectedly that the rhodium triphenylphospine catalyst system described in the instant invention is highly selective for the preparation of formyl esters even when the reaction is carried out at 180° C. with 1,600 p.s.i.g. hydrogen and 800 p.s.i.g. carbon monoxide and the conversion yield from oleic esters is 98.2 percent after only 6 hours of reaction time (see Example 8 below).

As reported by R. L. Pruett and J. A Smith in the Journal of Organic Chemistry, vol. 34, pp. 327–330 (1969), ligand complex catalysts derived from rhodium chemically combined with carbon monoxide and trialkyl and triaryl phosphite esters were taught as catalyzing the low-pressure hydroformylation of alpha or terminal short chain olefins to increase the ratio of normal to isoaldehyde compounds, and as described by R. L. Pruett and K. O. Groves in U.S. Pat. 3,499,933, issued Mar. 10, 1970, the same complexed rhodium compounds catalyze the dihydroformylation of polycyclic nonconjugated diolefins. Elemental rhodium or simple rhodium compounds such as rhodium chloride have very weak hydroformylation activity and cause the addition of hydrogen to olefinic double bonds under hydroformylation conditions. It is therefore quite unobvious for even one skilled in the art that metallic rhodium on an inert support in the copresence of triphenylphosphine effects the selective hydroformylation of internal olefinic compounds such as oleic fatty esters, acid, or triglyceride oils to yield exclusively the 9- and 10-formyl stearic esters, acids, or triglyceride oils with little or no coformation of alcohols or stearic esters.

I have also discovered that the diunsaturated linoleic and triunsaturated linolenic acid esters are also effectively hydroformylated with the rhodium and triphenylphosphine catalyst system described in the instant invention. Methyl linoleate was converted into a mixture of formyl oleate and diformylstearate (see Example 19 below). Methyl linolenate was converted into a mixture of formyl linoleate and into other polyformyl esters (see Example 20 below). Vegetable oils such as soybean oil and linseed oil which contain both linoleic and linolenic acids as main constituents are effectively hydroformylated with the rhodium and triphenylphosphine catalyst system. The polyunsaturation of these vegetable oils was converted into high yields of products containing one or more formyl groups and residual unsaturation. I have also discovered most unexpectedly that the product obtained from linoleic safflower oil esters can be greatly different depending upon the conditions of hydroformylation. When safflower oil esters are hydroformylated at 100° C. and 1,000 p.s.i.g. of synthesis gas with 0.5 percent of rhodium catalyst in the presence of triphenylphosphine the product obtained is a mixture of formyl oleate and diformyl stearate (see Example 21 below). However, when safflower oil esters are hydroformylated at 150° C. and 1,500 p.s.i.g. of synthesis gas with 2 percent of the same rhodium and triphenylphosphine catalyst, the formyloleate formed is hydrogenated and the product consists essentially of a mixture of monoformyl stearate and diformyl stearate (see Example 22).

For various polymer applications it is often desirable to prepare formyl products which have a certain amount of unsaturation. Such unsaturated formyl products have dual functionality which is extremely useful for polymerization. By the process described in the instant invention it is possible to carry out a partial hydroformylation by stopping the catalytic reaction at any desired degree of conversion by simply cooling rapidly the reaction vessel to a temperature at which the rhodium and triphenylphosphine catalyst system is no longer active. By this process of partial hydroformylation highly useful formyl products can be thus prepared with a controlled degree of unsaturation and such products are tailor-made for various polymer applications. For coating applications it is also very important that the unsaturated fatty materials do not have the trans configuration because trans unsaturated fatty materials prepared from polyunsaturated vegetable oils are known to be slower in drying and exhibit undesirable aftertack. I have discovered that the triphenylphosphine component of the catalyst herein described has the unexpected property of preventing isomerization of the unreacted unsaturation thereby making it possible by partial hydroformylation of cis polyunsaturated vegetable oil material to prepare cis unsaturated formyl products. These cis unsaturated formyl products and their derivatives are highly useful in coating applications because of their rapid drying properties.

The following specific embodiments are intended to illustrate more particularly the invention.

EXAMPLE 1

A 2-liter autoclave was charged with 500.2 g. oleic safflower oil methyl esters having the composition shown in the center column of Table I as determined by gas chromatography. The catalyst consisting of 5.0 g. of 5 weight percent rhodium metal supported on carbon and 4.6 g. of triphenylphosphine was added together with 300 ml. of toluene as a solvent. The autoclave was sealed, purged three times with approximately 200 p.s.i.g. of a 1:1 mixture of hydrogen and carbon monoxide, and then pressurized with the same gas mixture to 2,200 p.s.i.g. The vessel was shaken mechanically. Heat was applied and after 45 minutes the temperature reached 110° C. Hydroformylation began in the range between 95° and 110° C. and during this period the pressure reached a maximum of 2,550 p.s.i.g. and then decreased to 2,050 p.s.i.g. The temperature was then controlled at 110°±3° C. for 4 hours during which period the pressure declined to 1,225 p.s.i.g. and remained constant. The autoclave and contents were cooled to room temperature and the gases were vented. The contents were removed and filtered by suction on a Büchner funnel through a thin layer of diatomaceous earth supported on No. 1 grade Whatman filter paper. The toluene solvent was removed from the product by water aspirator vacuum. The light brown crude product weighed 547 g. and had the fatty acid composition shown in the right-hand column of Table I as determined by gas chromatography of methyl esters prepared from the crude product.

TABLE I

| | Untreated oleic safflower methyl esters | Hydroformylated methyl esters |
|---|---|---|
| Methyl ester constituents, percent: | | |
| Palmitate | 4.1 | 5.6 |
| Stearate | 1.8 | 2.1 |
| Oleate | 77.9 | 0.0 |
| Linoleate | 16.2 | 0.3 |
| 9(10)-formyl stearate | 0.0 | 92.0 |
| Total | 100.0 | 100.0 |

Methyl formyl stearate was present in the final product at a concentration of 92.0 percent representing a conversion of 97.8 percent of the oleate and linoleate components in the starting oleic safflower oil methyl esters. The product was identified as essentially all methyl 9(10)-formyl stearate by comparison with a known standard compound isolated from the hydroformylation of pure methyl oleate and converted to the methyl 9(10)-carbomethoxy stearate by oxidation followed by methylation and identified in turn by mass spectrometry. Distillation of the crude hydroformylation product yielded a clear and colorless product boiling in the range of 146° and 186° C. at 3 to 4 micron mercury pressure absolute and in yield of 92.5 weight percent.

EXAMPLE 2

A 2-liter autoclave was charged with 998 g. if oleic safflower oil having the fatty acid composition of the corresponding methyl esters shown in Table I, 10 g. of 5 weight percent rhodium metal supported on carbon, and 9 g. of triphenylphosphine. No solvent was employed. The autoclave was sealed, purged three times with a 1:1 mixture of hydrogen and carbon monoxide, and then pressurized with the same gas mixture to 2,000 p.s.i.g. Mechanical shaking was begun and heat was applied. After 30 minutes the temperature reached 110° C. Hydroformylation began in the range between 87° and 110° C. and during this period the pressure reached a maximum of 2,300 p.s.i.g. and then decreased to 1,675 p.s.i.g. The temperature was controlled at 110°±3° C. for a period of 3 hours during which period the pressure declined to a range of 1,000 to 1,300 p.s.i.g. and was restored to 2,000 p.s.i.g. with the 1:1 hydrogen and carbon monoxide mixture at approximately 10 to 25 minutes intervals until the pressure remained constant at 1,850 p.s.i.g. for 1 hour. The autoclave and contents were cooled to room temperature and the gases were vented. The contents were removed and filtered to give a light-brown oil weighing 1,212 g. The fatty acid composition of the product was determined after converting a sample into methyl esters. The following gas chromatography analysis was obtained: 5.3 percent palmitate, 2.8 percent stearate, 1.4 percent dienes and other unidentified material, and 90.5 percent 9(10)-formyl stearate. The conversion yield from total unsaturation in the starting oil to formyl ester product oil to formyl ester product is 96.1 percent.

A 1,001-g. portion of the above crude hydroformylated oil was hydrogenated in the presence of a conventional Raney nickel catalyst in an autoclave at 97° to 111° C. and under hydrogen pressure ranging from 500 to 1,000 p.s.i.g. The filtered product was light brown and weighed 903 g. The fatty acid composition of the product was determined after saponification of a sample to the free acids which were then methylated and acetylated. The following gas chromatography analysis was obtained: 4.5 percent palmitate, 2.2 percent stearate, 1.7 percent diene and other unidentified material, and 91.6 percent hydroxymethyl stearate.

EXAMPLE 3

A 2-liter autoclave was charged with 500 g. of olive oil methyl esters having the composition shown in the center column of Table II and determined by gas chromatography. The catalyst consisting of 2.5 g. of 5 weight percent rhodium metal supported on calcium carbonate and 2.2 g. of triphenylphosphine was added together with 300 ml. of toluene solvent. The autoclave was sealed, purged three times with hydrogen and then pressurized with 1,050 p.s.i.g. of hydrogen and 1,050 p.s.i.g. carbon monoxide. Mechanical shaking was begun and heat applied. After 38 minutes the temperature reached 110° C. Hydroformylation began in the range between 103° and 110° C. and during this period the pressure reached a maximum of 2,600 p.s.i.g. and then decreased to 2,525 p.s.i.g. The temperature was then controlled at 110°±1° C. After 5 hours and 42 minutes the pressure declined to 1,495 p.s.i.g. The heating period was prolonged for another 35 minutes during which time the pressure remained constant. The autoclave and contents were cooled to room temperature and the gases were vented. The contents were removed and filtered. The light yellow product obtained after evaporation of the toluene solvent weighed 579.5 g. and had the fatty acid composition shown in Table II as determined by gas chromatography of the methyl esters prepared from the crude product.

TABLE II

| | Untreated olive oil methyl esters | Hydroformylated methyl esters |
|---|---|---|
| Methyl ester constituents, percent: | | |
| Palmitate | 10.8 | 10.9 |
| Stearate | 2.3 | 2.4 |
| Oleate | 78.9 | 2.5 |
| Linoleate | 8.0 | 5.3 |
| 9(10)-formyl stearate | 0.0 | 78.9 |
| Total | 100.0 | 100.0 |

Methyl 9(10)-formyl stearate was present in the final product at a concentration of 78.9 percent which represents a conversion of 90.8 percent of the total unsaturation in the starting olive oil esters. Fractional distillation of the reaction product yielded the following fractions:

| | Temp., °C. | P., mm. Hg | Weight, grams | Formyl stearate, percent |
|---|---|---|---|---|
| Fraction: | | | | |
| 1 | 164–170 | 0.4 | 62.3 | 26.0 |
| 2 | 170–175 | 0.1–0.2 | 396.2 | 88.5 |
| 3 | 176–200 | 0.1–0.5 | 48.3 | 99.0 |
| 4 | 210 | 0.2 | 3.2 | 72.3 |
| Residue | | | 69.5 | |

Fraction 3 which was 99.0 percent pure by gas chromatography and 98.0 percent pure by aldehyde titer had the following elemental analysis: carbon 73.68 percent, hydrogen 11.85 percent, and oxygen (by difference) 14.47 percent compared to a calculated analysis for $C_{20}H_{38}O_3$ of carbon 73.60 percent, hydrogen 11.65 percent, and oxygen 14.75 percent.

A 285-g. portion of the above distilled fraction 2 was oxidized with a mixture of air and potassium permanganate. The aldehyde ester fraction was dissolved in 1 liter acetone and cooled in an ice-water bath. The solution was agitated by air bubbling through a fritted glass bubbler by passing air into the reaction mixture by suction from the atmosphere. From a dropping funnel a solution of 1 liter acetone and 10 g. potassium permanganate was added dropwise during a period of 1½ hours. After addition of the permanganate solution the temperature of the reaction mixture was allowed to warm to room temperature and air bubbling was continued for a total of 4 hours. The acetone solvent was removed almost completely by evaporation under a water aspirator vacuum at room temperature. The residual ester solution was suspended in water and the unused potassium permanganate was reduced with excess sodium meta bisulfite until the purple color disappeared. The carboxy ester product was extracted with petroleum ether in a separatory funnel and the extract was washed several times with an aqueous solution saturated with sodium meta bisulfite until the brown organic layer became light in color. The organic layer was then washed free of bisulfite with distilled water and then dried with sodium sulfate. The light amber methyl carboxy stearate product weighed 267 g.

A 259-g. portion of the above methyl carboxy stearate was saponified with sodium hydroxide, and the free carboxy stearic acid was isolated by conventional means in yield of 237 g. Distillation of 224-g. portion of the crude carboxy stearic acid with an alembic type still yielded the following fractions:

| Fraction: | Temp., °C. | P., mm. Hg | Weight, grams |
|---|---|---|---|
| 1 | 153–212 | 0.04 | 10 |
| 2 | 212–218 | 0.04 | 81 |
| 3 | 218–221 | 0.01 | 72 |
| 4 | 221–227 | 0.01 | 32 |
| Residue | | | 29 |

Fractions 3 and 4 were combined and analyzed directly by potentiometric titration. An acid value of 329 was obtained which corresponds to a purity of 96 percent for carboxy stearic acid. Another portion of the distilled acid was methylated with methanol and boron trifluoride. Gas chromatography of the methyl esters gave the following analysis: 0.3 percent palmitate, 1.0 percent stearate, 0.1 percent oleate, 91.4 percent 9(10)-carboxy stearate, and 7.2 percent other isomers of carboxy stearate.

EXAMPLE 4

A 2-liter autoclave was charged with 500 g. of olive oil fatty acids having the same composition as the methyl esters used in Example 3 (Table II). The catalyst consisting of 5.0 g. of 5 weight percent rhodium metal supported on carbon and 2.0 g. of triphenylphosphine was added together with 250 ml. toluene solvent. The autoclave was sealed, purged three times with a 1:1 mixture of hydrogen and carbon monoxide and then pressurized with the same gas mixture to 600 p.s.i.g. After 43 minutes the temperature reached 109° C. Hydroformylation began in the range between 80° and 109° C. and during this period the pressure reached a maximum of 685 p.s.i.g. and then decreased to 480 p.s.i.g. The temperature was controlled at 110°±3° C. for a period of 4 hours and 49 minutes. During this period the pressure was restored from about 500 to 600 p.s.i.g. 9 times. During the last 20 minutes the pressure remained constant at 565 p.s.i.g. The autoclave and contents were cooled to room temperature and the gases were vented. The contents were removed and filtered to give a brown liquid weighing 553 g. A sample of this formyl stearic acid product was methylated and gave the following analysis by gas chromatography: 11.3 percent palmitate, 3.2 percent stearate, 0.5 percent oleate, 0.9 percent diene and other unidentified material, and 84.1 percent 9(10-formyl stearate. The conversion yield from total unsaturation in the starting oleic fatty acid to formyl stearic acid product is 96.8 percent.

EXAMPLES 5–18

In Examples 5–18, a 250-ml. rocking autoclave was used with olive oil methyl esters having the same composition as the esters used in Example 3 (Table II). In Examples 5–16, the catalyst was employed as 5.0 weight percent rhodium metal on carbon, or calcium carbonate, or alumina. In Examples 17 and 18 the catalyst sources were filtered hydroformylation products containing soluble rhodium catalyst. The procedure for hydroformylation was carried out precisely as described in Example 1. The pertinent data and gas chromatography analyses of the filtered products are set out in Table III.

TABLE III

| Example | Olive oil esters, grams | Solvent | Rh catalyst added, Ml. | Rh catalyst percent metal | Ph₃P added, percent | Initial pressure, p.s.i.g. H₂ | Initial pressure, p.s.i.g. CO | Reaction Temp., °C. | Reaction Time, hours | Product, grams | Percent Formyl stearate | Percent Conversion yield |
|---|---|---|---|---|---|---|---|---|---|---|---|---|
| 5 | 55.5 | Toluene | 50 | 0.2 | 3.5 | 1,000 | 1,000 | 94–96 | 6 | 59.7 | 77.1 | 88.7 |
| 6 | 55.5 | None | | 0.2 | 3.5 | 1,000 | 1,000 | 107–110 | 5 | 62.9 | 84.8 | 97.6 |
| 7 | 55.5 | Toluene | 50 | 0.2 | 3.5 | 250 | 250 | 125–130 | 6 | 61.7 | 80.5 | 92.6 |
| 8 | 55.5 | do | 50 | 0.1 | 1.8 | 1,600 | 800 | 178–180 | 6 | 59.7 | 85.3 | 97.8 |
| 9 | 11.1 | do | 50 | 0.2 | 3.6 | 500 | 500 | 100 | 6 | | 78.2 | 90.0 |
| 10 | 11.1 | do | 50 | 0.2 | 3.6 | 1,500 | 1,500 | 109–110 | 6 | | 74.7 | 86.0 |
| 11 | 55.5 | do | 50 | 0.4 | 7.1 | 1,000 | 1,000 | 108–112 | 5 | 62.6 | 78.7 | 90.6 |
| 12 | 55.5 | do | 50 | 0.1 | 0.9 | 1,000 | 1,000 | 107–110 | 4 | 59.2 | 86.1 | 99.1 |
| 13 | 55.1 | do | 50 | 0.1 | 0.45 | 1,000 | 1,000 | 109–111 | 4 | 60.5 | 81.5 | 93.8 |
| 14 | 55.5 | do | 50 | 0.1 | 0.05 | 1,000 | 1,000 | 109–110 | 4 | 59.2 | 85.2 | 98.0 |
| 15 | 55.5 | do | 50 | 0.1 | 0.0 | 1,000 | 1,000 | 9–110 | 6 | 54.8 | 49.5 | 57.0 |
| 16 | 55.5 | Methanol | 50 | 0.1 | 1.6 | 1,000 | 1,000 | 106–110 | 5 | 59.0 | 83.9 | 95.9 |
| 17 | 27.8 | Toluene | 50 | (a) | 0.0 | 1,000 | 1,000 | 109–111 | 6 | 59.2 | 85.6 | 98.5 |
| 18 | 41.6 | do | 50 | (b) | 0.0 | 1,000 | 1,000 | 109–111 | 6 | 58.7 | 83.3 | 95.9 | a 27.8 grams filtered product from Example 5 and containing 36 p.p.m. Rh in solution.
b 13.9 grams filtered product from Example 11 and containing 37 p.p.m. Rh in solution.

Referring to Examples 5–11 in Table III, it is evident that essentially quantitative conversion of the unsaturation in olive oil esters into formyl esters is obtained under wide range of rhodium catalyst and triphenylphosphine concentrations, pressures of hydrogen and carbon monoxide, and reaction temperatures. The effect of triphenylphosphine concentration is illustrated in Examples 12–15. The ratio of triphenylphosphine to rhodium catalyst was varied from 0.5 to 9 with little effect on yield which varied from 93.8 percent in Example 13 to 99.1 percent in Example 12. However, the absence of triphenylphosphine in Example 15 resulted in a drastic decrease in yield of formyl stearate to only 57.0 percent even though the reaction time was prolonged from 4 to 6 hours. Furthermore, it was established by thin-layer chromatography and by mass spectrometry that the products obtained in Examples 12–14 in the presence of triphenylphosphine consisted of essentially only the 9- and 10-formyl stearate whereas the product in Example 15 in the absence of triphenylphosphine was a mixture of isomers with formyl branches located between carbon number 7 and carbon number 15. Example 16 demonstrated that methanol can be used effectively as a solvent in producing high yields of formyl stearate from olive oil esters. In fact, the product of Example 16 had no evidence of methyl acetals as might have been expected from the reaction of the aldehyde and methanol. Examples 17 and 18 illustrate that the soluble rhodium catalyst present in filtered hydroformylation products from Examples 5 and 11 is equally as effective as the supported rhodium catalyst in presence of triphenylphosphine in converting olive oil esters into high yields of formyl esters.

EXAMPLE 19

A 250-ml. autoclave was charged with 20.0 g. methyl linoleate, 0.41 g. of 5 weight percent rhodium metal supported on alumina and 0.19 g. triphenylphosphine together with 50 ml. toluene solvent. The autoclave was purged with a 1:1 mixture of hydrogen and carbon monoxide, and then pressurized with the same gas mixture to 2,000 p.s.i.g. The vessel was shaken mechanically and heated. After 38 minutes the temperature reached 100° C. and the pressure reached 2,475 p.s.i.g. The temperature was controlled at 100°±4° C. during a period of 6 hours during which period the pressure declined to 2,100 p.s.i.g. and remained constant for 1 hour. Total uptake was 375 p.s.i.g. compared to 275 p.s.i.g. for an equivalent weight of methyl oleate. After the reaction period of 6 hours the autoclave and contents were cooled to room temperature and the gases were vented. The contents were removed and filtered. The toluene solvent was distilled off and a light yellow oil weighing 22.8 g. was obtained. Gas chromatography and carbonyl analyses of the final product are set out in Table IV and compared with those of a sample partially hydroformylated for 3 hours.

TABLE IV

| | Hydroformylated methyl linoleate for— | |
|---|---|---|
| | 3 hours | Final (6 hours) |
| Analyses, percent: | | |
| Stearate | 0.2 | 0.2 |
| Oleate | 1.1 | 0.2 |
| Linoleate | 10.1 | 0.0 |
| Conjugated linoleate | 4.3 | 1.6 |
| Formyl stearate | 0.0 | 3.7 |
| Formyl oleate | 48.6 | 19.8 |
| Diformyl stearate | 35.7 | 74.5 |
| Total | 100.0 | 100.0 |
| Carbonyl value, meq. per g | 3.27 | 4.02 |

Gas chromatography and carbonyl analyses show that methyl formyl oleate and methyl diformyl stearate are the major products of the hydroformylation of methyl linoleate.

Methyl formyl oleate and diformyl stearate were characterized by gas and thin-layer chromatography retention data and by nuclear magnetic resonance studies. It was shown by infrared that the single double bond in methyl formly oleate is cis and that it is converted to methyl formyl stearate by hydrogenation.

Methyl formyl oleate is represented by the general formulae:

$$CH_3-(CH_2)_x-CH=CH-(CH_2)_y-\underset{\underset{CHO}{|}}{CH}-(CH_2)_z-COOCH_3$$

and $$CH_3-(CH_2)_x-\underset{\underset{CHO}{|}}{CH}-(CH_2)_y-CH=CH-(CH_2)_z-COOCH_3$$

where $x+y+z=13$.

Methyl diformyl stearate is represented by the general formula:

$$CH_3-(CH_2)_x-\underset{\underset{CHO}{|}}{CH}-(CH_2)_y-\underset{\underset{CHO}{|}}{CH}-(CH_2)_z-COOCH_3$$

where $x+y+z=14$.

EXAMPLE 20

A 250-ml. autoclave was charged with 23.3 g. methyl linolenate, 0.48 g. of 5 weight percent rhodium metal supported on alumina and 0.24 g. triphenylphosphine together with 50 ml. toluene solvent. The procedure for hydroformylation was carried out precisely as described for Example 19 except that the total reaction time was 4 hours instead of 2. Total uptake of synthesis gas was 525 p.s.i.g. compared to 275 p.s.i.g. for an equivalent weight of methyl oleate. The hydroformylation product of linolenate was a pale-yellow and weighed 23.7 g. Gas chromatography and carbonyl analyses of the final product are set out in Table V and compared with those of a sample partially hydroformylated for 2 hours.

TABLE V

| | Hydroformylated linolenate for— | |
|---|---|---|
| | 2 hours | Final (4 hours) |
| Analyses, percent: | | |
| Oleate | 0.1 | 0.0 |
| Linoleate | 0.4 | 0.0 |
| Linolenate | 5.0 | 0.6 |
| Conjugated linolenate | 6.4 | 1.6 |
| Formyl linoleate | 38.1 | 12.4 |
| Di- and triformyl esters | 50.0 | 85.4 |
| Total | 100.0 | 100.0 |
| Carbonyl value, meq. per g | 6.52 | 6.93 |

Gas chromatography and carbonyl analyses show that methyl formyl linoleate and di- and triformyl esters are the major products of the hydroformylation of methyl linolenate. Methyl formyl linoleate and the di- and triformyl esters were characterized in the same manner as described in Example 19. The products are represented by the following formulae:

Methyl formyl linoleate, $$CH_3-(CH_2)_w-CH=CH-(CH_2)_x-CH=CH-(CH_2)_y-\underset{\underset{CHO}{|}}{CH}-(CH_2)_z-COOCH_3$$

$$CH_3-(CH_2)_w-CH=CH-(CH_2)_x-\underset{\underset{CHO}{|}}{CH}-(CH_2)_y-CH=CH-(CH_2)_z-COOCH_3$$

and $$CH_3-(CH_2)_w-\underset{\underset{CHO}{|}}{CH}-(CH_2)_x-CH=CH-(CH_2)_y-CH=CH-(CH_2)_z-COOCH_3$$

where $w+x+y+z=11$;

Methyl diformyl oleate, $$CH_3-(CH_2)_w-CH=CH-(CH_2)_x-\underset{\underset{CHO}{|}}{CH}-(CH_2)_y-\underset{\underset{CHO}{|}}{CH}-(CH_2)_z-COOCH_3,$$

$$CH_3-(CH_2)_w-\underset{\underset{CHO}{|}}{CH}-(CH_2)_x-CH=CH-(CH_2)_y-\underset{\underset{CHO}{|}}{CH}-(CH_2)_z-COOCH_3$$

and $$CH_3-(CH_2)_w-\underset{\underset{CHO}{|}}{CH}-(CH_2)_x-\underset{\underset{CHO}{|}}{CH}-(CH_2)_y-CH=CH-(CH_2)_z-COOCH_3$$

where $w+x+y+z=12$;

Methyl diformyl stearate, $$CH_3-(CH_2)_x-\underset{\underset{CHO}{|}}{CH}-(CH_2)_y-\underset{\underset{CHO}{|}}{CH}-(CH_2)_z-COOCH_3$$

where $x+y+z=14$; and

Methyl triformyl stearate, $$CH_3-(CH_2)_w-\underset{\underset{CHO}{|}}{CH}-(CH_2)_x-\underset{\underset{CHO}{|}}{CH}-(CH_2)_y-\underset{\underset{CHO}{|}}{CH}-(CH_2)_z-COOCH_3$$

where $w+x+y+z=13$.

EXAMPLE 21

A 2-liter autoclave was charged with 500 g. safflower oil methyl esters having the composition shown in Table VI as determined by gas chromatography. The catalyst consisting of 2.5 g. of 5 weight percent rhodium metal supported on alumina and 1.25 g. of triphenylphosphine was added together with 500 ml. toluene as a solvent. The autoclave was sealed, purged three times with a 1:1 mixture of hydrogen and carbon monoxide, and then pressurized with the same gas mixture to 1,000 p.s.i.g. The vessel was shaken mechanically and heat was applied. After 40 minutes the temperature reached 100° C. and during this period the pressure reached a maximum of 1,100 p.s.i.g. and then decreased to 1,000 p.s.i.g. The temperature was controlled at 100°±2° C. for 4 hours during which period the pressure declined to a range of 690 to 700 p.s.i.g. and was restored two times with the 1:1 hydrogen and carbon monoxide mixture to 1,000 p.s.i.g.

After this period of 4 hours the temperature was raised to 110°±2° C. and heating was continued for another interval of 2 hours. During this period the pressure decreased from 980 to 800 p.s.i.g. and was restored one time with the 1:1 hydrogen and carbon monoxide mixture to a pressure of 1,100 p.s.i.g. After a total reaction time of 6 hours the autoclave and contents were cooled to room temperature and the gases were vented. The contents were removed and filtered to give a light-yellow oil weighing 538 g. The gas chromatography and carbonyl analyses of the filtered product are set out in Table VI. The final product contained a mixture of 9.4 percent methyl formyl stearate, 34.6 percent methyl formyl oleate, and 17.7 percent diformyl stearate. These formyl products were identified by comparison with those isolated from the hydroformylation of pure methyl linoleate.

TABLE VI

| | Untreated safflower methyl esters | Hydroformylated methyl esters |
|---|---|---|
| Methyl ester constituents, percent: | | |
| Palmitate | 7.3 | 7.1 |
| Stearate | 2.9 | 3.1 |
| Oleate | 14.3 | 6.7 |
| Linoleate | 75.5 | 6.1 |
| Conjugated linoleate | 0.0 | 15.3 |
| Formyl stearate | 0.0 | 0.5 |
| Formyl oleate | 0.0 | 34.6 |
| Diformyl stearate | 0.0 | 17.7 |
| Total | 100.0 | 100.0 |
| Carbonyl value, meq. per g | 0.0 | 2.76 |

EXAMPLE 22

A 2-liter autoclave was charged with 500 g. safflower oil methyl esters having the same composition as the methyl esters used in Example 21 (Table VI). The catalyst consisting of 10 g. of 5 weight percent rhodium metal supported on alumina and 5 g. of triphenylphosphine was added together with 500 ml. toluene solvent. The autoclave was sealed, purged three times with a 1:1 mixture of hydrogen and carbon monoxide and then pressurized with the same gas mixture to 1,500 p.s.i.g. Mechanical shaking was begun and heat was applied. After 35 minutes the temperature reached 150° C. Hydroformylation began in the range between 95° and 150° C. and during this period the pressure reached a maximum of 1,800 p.s.i.g. and then decreased to 780 p.s.i.g. The pressure was restored to 2,000 p.s.i.g with the 1:1 mixture of hydrogen and carbon monoxide. The temperature was controlled at 150°±4° C. for a period of 4 hours during which period the pressure declined to 1,190 p.s.i.g. and was restored to 1,740 p.s.i.g. with the 1:1 mixture of hydrogen and carbon monoxide until the pressure remained almost constant at 1,400 p.s.i.g. for approximately 1 hour. The autoclave and contents were cooled to room temperature and the gases were vented. The contents were removed and filtered to give a brown oil weighing 562 g. Gas chromatography of the final product gave the following analysis: 7.7 percent palmitate, 3.5 percent stearate, 38.5 percent formyl stearate, and 50.3 percent diformyl stearate. The carbonyl value of the final product was 3.84 meq. per g.

I claim:

1. A process for introducing oxygen functionality into unsaturated fatty compounds comprising reacting predominantly monounsaturated fatty compounds with hydrogen and carbon monoxide at pressures of from about 500 to 3,000 p.s.i.g. in the presence of a catalytic quantity of rhodium metal on a relatively inert support admixed with a trisubstituted phosphine at temperatures of from about 94° to 180° C. for a period of time sufficient to produce high yields of formyl products characterized by having formyl groups attached to one of the originally unsaturated carbon atoms in said monounsaturated fatty compounds, and filtering the reaction mixture to remove insoluble materials.

2. A process as described in claim 1 in which the predominantly monounsaturated fatty compounds are selected from the group consisting of olive oil, oleic safflower oil, oleic alkyl esters, olive oil mixed esters, and olive oil free fatty acids, from which high yields of 9- and 10-formyl saturated triglycerides, esters, and fatty acids are obtained.

3. A process as described in claim 2 in which the formyl groups in the formyl products are reduced to hydroxymethyl groups by catalytic hydrogenation.

4. A process as described in claim 2 in which the formyl groups in the formyl products are oxidized to carboxy groups by reacting said formyl products with air and potassium permanganate.

5. A process for introducing oxygen functionality into unsaturated fatty compounds comprising reacting predominantly polyunsaturated fatty compounds with hydrogen and carbon monoxide at pressures of from about 1,000 to 1,500 p.s.i.g. in the presence of a catalytic quantity of rhodium metal on a relatively inert support admixed with a trisubstituted phosphine at temperatures of from about 100° to 150° C. for a period of time sufficient to produce high yields of mixed saturated and unsaturated mono- and polyformyl products, and filtering the reaction mixture to remove insoluble materials.

6. A process as described in claim 5 in which the polyunsaturated fatty compounds are selected from the group consisting of linoleic acid, linoleic alkyl and triglyceryl esters, formyl products of which are characterized as being essentially a mixture of mono- and diformyl saturated and monoformyl monounsaturated compounds.

7. A process as described in claim 5 in which the polyunsaturated fatty compounds are selected from the group consisting of linolenic acids, alkyl and triglyceryl esters, the formyl products of which are characterized as being essentially a mixture of mono-, di-, and triformyl saturated, monoformyl diunsaturated, and diformyl monounsaturated compounds.

8. The compound formyl oleate of the following formulae:

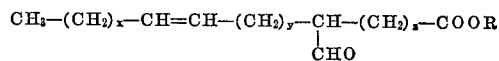

and

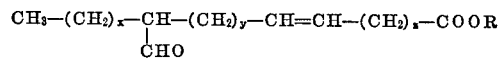

where $x+y+z=13$, and where R is hydrogen, methyl, or the residue of a triglyceride radical.

9. The compound formyl linoleate of the following formulae:

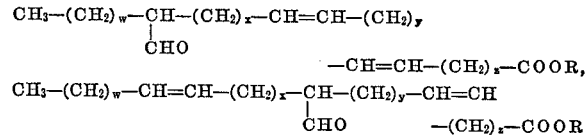

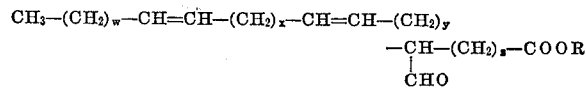

where $w+x+y+z=11$, and where R is hydrogen, methyl, or the residue of a triglyceride radical.

10. The compound named diformyl oleate of the following formulae:

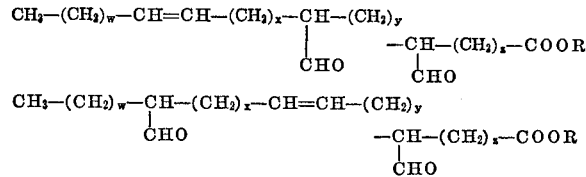

and

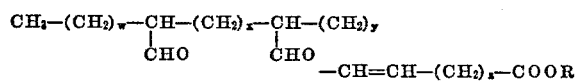
—CH=CH—(CH$_2$)$_z$—COOR where $w+x+y+z=12$, and where R is hydrogen, methyl, or the residue of a triglyceride radical.

11. The compound named triformyl stearate of the following formula:

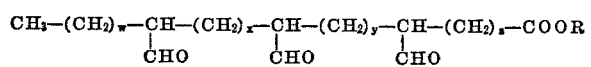—COOR where $w+x+y+z=13$, and where R is hydrogen, methyl, or the residue of a triglyceride radical.

References Cited

UNITED STATES PATENTS

| | | | |
|---|---|---|---|
| 3,683,019 | 8/1972 | Wakamatsu et al. | 260—534 E |
| 3,239,566 | 3/1966 | Slaugh et al. | 260—604 |
| 3,527,809 | 9/1970 | Pruett et al. | 260—604 |
| 2,802,843 | 8/1957 | Tramm et al. | 260—410.6 |
| 2,891,084 | 6/1959 | Alm et al. | 260—410.9 |

FOREIGN PATENTS

| | | |
|---|---|---|
| 646,424 | 11/1950 | Great Britain. |
| 849,548 | 10/1951 | Germany. |

OTHER REFERENCES

Frankel et al.: J. Am. Oil Chemists Soc., vol. 46 (3), 133–8, March 1969.

Noller: "Chemistry of Organic Compounds," W. B. Saunders Co., Philadelphia and London (1965), p. 235 relied on.

Dufek et al.: J. Am. Oil Chemists Soc., 47 (2), pp. 47–50, February 1970, pp. 47 and 50 relied upon.

LEWIS GOTTS, Primary Examiner

D. G. RIVERS, Assistant Examiner

U.S. Cl. X.R.

252—431 C, 431 P; 260—410.9 R, 409, 413, 485 R, 485 G, 537 R, 537 N, 537 P